United States Patent [19]

Claffy et al.

[11] 4,296,771
[45] Oct. 27, 1981

[54] QUIET IMPULSE STEAM TRAP

[75] Inventors: Richard D. Claffy, Glen Burnie, Md.; Reginald B. Lovelace, West Palm Beach, Fla.

[73] Assignee: The United States of America as represented by the Secretary of the Navy, Washington, D.C.

[21] Appl. No.: 181,931

[22] Filed: Aug. 27, 1980

Related U.S. Application Data

[63] Continuation-in-part of Ser. No. 969,741, Dec. 14, 1978, abandoned.

[51] Int. Cl.³ ............................................. G05D 11/00
[52] U.S. Cl. .................................. 137/110; 137/183; 137/625.37
[58] Field of Search .................... 137/110, 183, 625.28, 137/625.37

[56] References Cited

U.S. PATENT DOCUMENTS

| | | | |
|---|---|---|---|
| 2,051,732 | 8/1936 | McKee | 137/183 |
| 2,127,649 | 8/1935 | McKee | 137/183 |
| 3,018,023 | 1/1962 | Talarico | 137/183 |
| 3,470,896 | 10/1969 | Au Werter | 137/110 |
| 3,514,074 | 5/1970 | Self | 137/625.28 |
| 4,004,604 | 1/1977 | Deinlein-Kalb | 137/183 |

*Primary Examiner*—H. Jay Spiegel
*Attorney, Agent, or Firm*—R. F. Beers; L. A. Marsh; W. W. Randolph

[57] ABSTRACT

A steam trap is provided with two paths through which fluid flows from its input to its output. One path constitutes a control path wherein a small amount of steam or condensate continuously flows through restrictive orifices connected in series between the input and the output. The other path constitutes a main flow path in which a quiet throttling element having a plurality of resistive flow passages and having a moveable valve plug, controls the amount of fluid flowing therethrough. The position of the valve plug and a control piston connected thereto is a function of the fluid flow through the control path between the two orifices; the input and discharge fluid pressures; and a spring connected to the control piston.

9 Claims, 4 Drawing Figures

QUIET IMPULSE STEAM TRAP

This application is a continuation-in-part of application Ser. No. 969,741, filed Dec. 14, 1978, now abandoned.

BACKGROUND OF THE INVENTION

The field of this invention generally includes steam traps, and in particular, steam traps designed to operate quietly. The high fluid velocity of flash steam and condensate flowing past the valve seat of the prior art steam traps tends to generate high noise levels and to cause valve seat erosion including undercutting. The valve seat erosion causes the operation of the steam traps to gradually deteriorate. In some applications the noisy operation of prior art steam traps is very undesirable. Prior art quiet throttling elements have been successfully developed for steam valves and have substantially reduced the noise and erosion problem by greatly decreasing the velocity with which the steam flows through the valve. These throttling elements contain large numbers of very small passages through which the fluid flows. The size of each passage is small enough to reduce pressure by frictional loses and to thereby limit the velocity of fluid flow through it, while the number of passages is large enough to give the throttling element the required flow capacity. Valves with these quiet throttling elements are opened and closed by blocking or unblocking the entrances to these passageways. This type of valve action requires that the valve closing element move a greater distance than is required in standard valves and traps because the passage entrances are stacked one upon the other. The operating force required to move a valve closing element through the quiet throttling element is very high because of sliding friction and unbalanced pressure forces around the valve closing element. For this reason, operating forces in a quiet throttling element are normally higher than those in steam traps.

Examples of prior art steam traps and pressure operated valves are generally shown in U.S. Pat. Nos. 2,051,732; 2,127,649; 2,808,068; 2,936,772; 3,018,023; 3,514,074; 3,776,278; and 4,004,604.

Accordingly, one objective of this invention is to use a quiet throttling element in a steam trap to reduce the amount of throttling noise produced by the steam trap.

Another objective of this invention is to produce a steam trap wherein the closing element moves with a high operating force.

A further objective of this invention is to provide a steam trap which will not suffer valve seat degradation and will thus continue to reliably remove the condensate from a steam line while allowing very little steam to escape from the line.

SUMMARY OF THE INVENTION

These objectives of the invention are achieved by using an operating piston to move a valve plug through a quiet throttling element. The steam line fluid pressure is used to force the valve plug to the open position so that the condensate may flow through the throttling element and out of the trap. Fluid from the steam line is allowed to continuously flow out of the trap through two small control orifices connected in series. The fluid pressure between these two orifices pushes against the operating piston to move the valve plug to the closed position and to prevent fluid from flowing through the throttling element. When steam is flowing through the two control orifices, the pressure on the operating piston is high enough to force the valve plug to the closed position and prevent steam from passing through the throttling element. When cool condensate is passing through the two orifices, the pressure force on the operating piston is less than when the steam is passing through them. This causes the valve plug to move to the open position and allow condensate to pass through the throttling element and out of the trap. A spring is used to increase the operating force level enough for the use of a quiet throttling element and to hold the valve plug in the closed position when the steam trap is not pressurized.

A pressure balancing passage interconnects the discharge conduit with a chamber defined adjacent the piston element for opposing the spring and frictional forces and for causing the valve plug to move to an open position in the event of high backpressure surges. The relative sizes of the operating piston, the spring, and the valve plug are optimized so that the valve plug will respond correctly to changes in the pressure between the control orifices. These pressure changes occur when the fluid in the steam trap changes phase, from steam vapor to liquid and vice-versa.

BRIEF DESCRIPTION OF THE DRAWINGS

Whenever the same feature of the invention is illustrated in two or more figures, it is labelled with the same reference number.

DESCRIPTION OF THE PREFERRED EMBODIMENT

Figure 1:
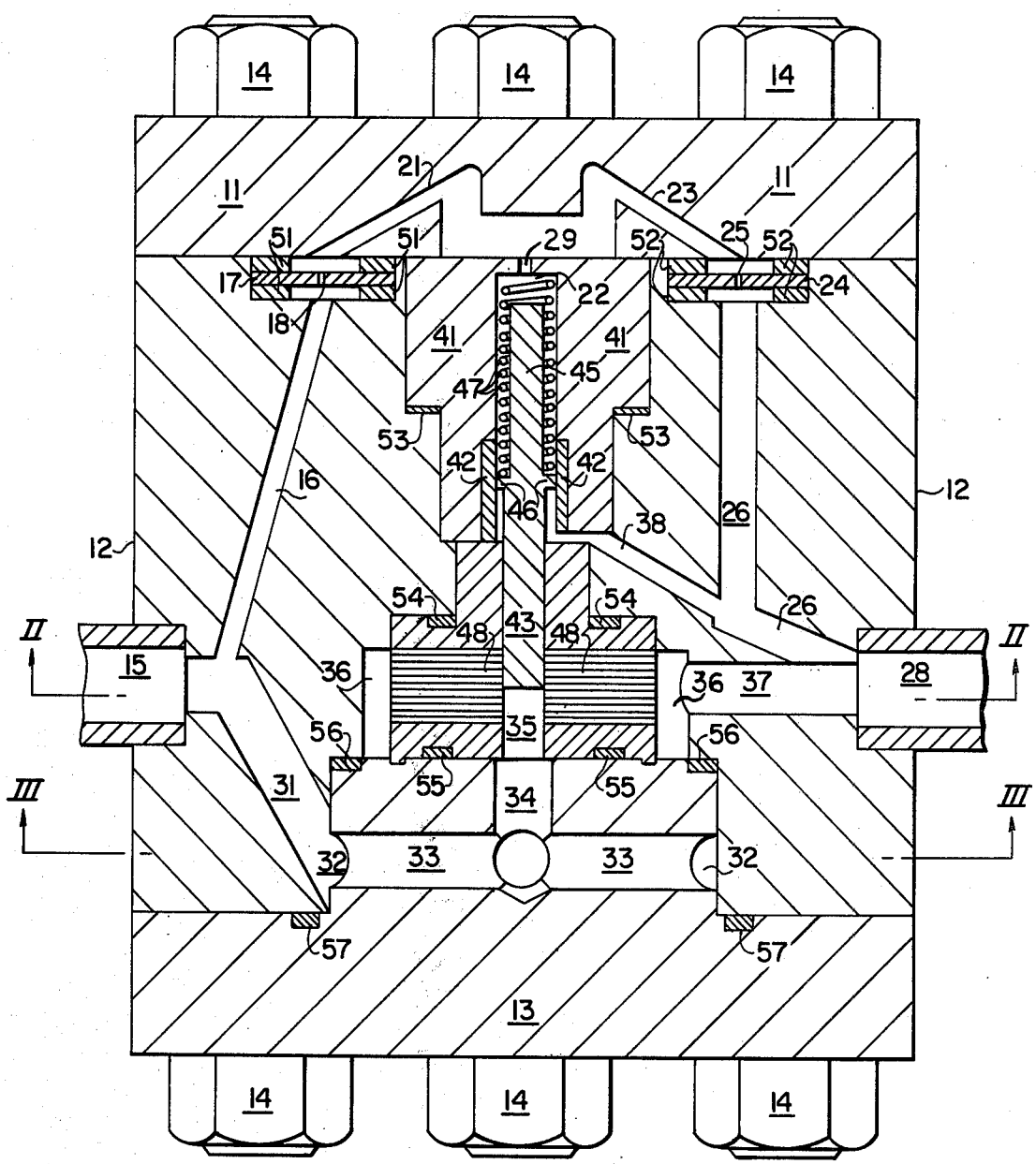
FIG. 1 is a cross-sectional view of the preferred embodiment of the steam trap.

As shown in the cross-sectional view of the preferred embodiment of the invention in FIG. 1, there are two pathways through which fluid may pass through the steam trap from the fluid inlet or input 15 to the discharge outlet or output 28. In one pathway, which comprises a bypass means, the fluid passes from the input 15 through passage 16, orifice 18, passages 21 and 23 which form a cavity, orifice 25 and passage 26 to the output 28.

Figure 2:
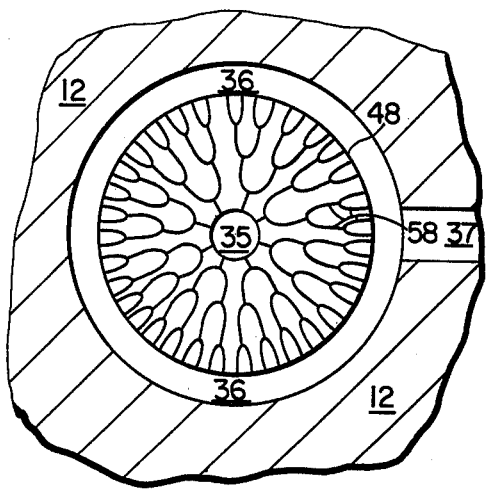
FIG. 2 is a partial cross-sectional view of the steam trap illustrating the internal construction of the throttling element.
Figure 3:
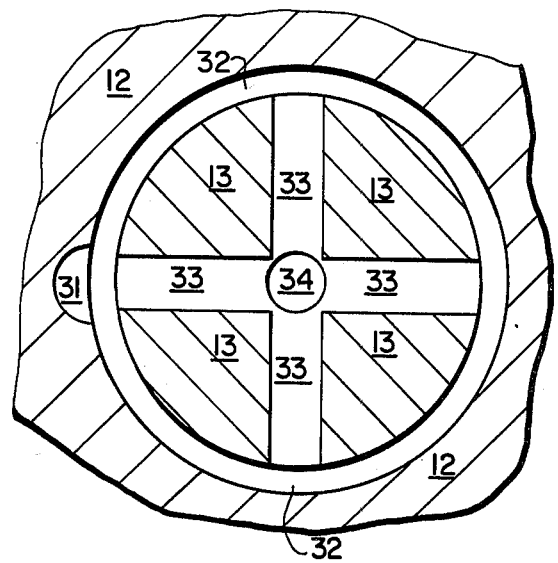
FIG. 3 is a partial cross-sectional view through the bottom plate of the steam trap illustrating the passageways through which fluid flows to the throttling element.

In the other pathway the fluid passes from the input 15 through main or primary flow passages 31, 32, 33, 34, and 35; throttling element 48; and main flow passages 36 and 37 to the output 28. As shown in FIG. 3, passage 32 is annular shaped and completely surrounds the raised portion of the bottom plate 13. It also directs fluid through each of the four passages 33 to the single passage 34. The throttling element 48 comprises a plurality of stacked discs with restrictive passages cut in each disc, as shown in FIG. 2, to allow the fluid to flow from the passageway 35 through the restrictive passages and into the outside annular main flow passageway 36. When the discs are stacked together, grooves 58 become tiny passageways through which the fluid may flow. The size and routes of these restrictive passageways are designed so that the fluid velocity through each of them is relatively small and therefore the amount of erosion and throttling noise is minimized. The required flow capacity of the throttling element is achieved by placing numerous grooves 58 on each disc and using a sufficient number of discs in the throttling element.

The valve plug 43 fits closely within the inside cylindrical surface of the throttling element 48, so that it will block the flow of fluid from the passageway 35 into the grooves 58 in the throttling element. In FIG. 1, the valve plug 43 is shown halfway between its open position and its closed position. In its open position, the piston 43 is withdrawn from the throttling element 48 to expose most of the restrictive passages and in its closed position the valve plug 43 is inserted through the throttling element 48 so as to block the flow of fluid through any of the grooves 58 in any of the discs in the throttling element. The valve plug 43 is connected to the control piston 46 which moves within a hardened cylinder liner 42. The extension 45 of the control piston 46 acts as a stroke limiter to prevent the piston from bottoming the spring. The extension 45 also acts as a guide for the spring 47. The spring 47 pushes down on the control piston 46 to hold it and the valve plug 43 in the normally closed position when there is no fluid pressure within the steam trap. Passageway 38 which connects to passageway 26 and the output 28 of the trap maintains the fluid pressure on the lower side of the control piston at the same level as the output of the trap. The spring 47 and fluid pressure within the cylinder 22 will push downward on the control piston 46 to force the valve plug 43 towards the closed position. Fluid pressure within the passageway 35 will push upward on the valve plug 43 to tend to force it to the open position. Thus, the movable valve element formed by the integral valve plug 43, control piston 46, and extension 45 is designed to move within an elongated chamber generally defined by cylinder 22, cylinder liner 42 and passageway 35. The elongated chamber is subdivided by the movable valve element so that one end portion of the elongated chamber (eg. passageway 35) communicates with the main flow passages; the other end portion of the elongated chamber (eg. cylinder 22) communicates with the bypass passageways; and the intermediate portion of the elongated chamber communicates with the output 28 through duct 38.

Figure 4:
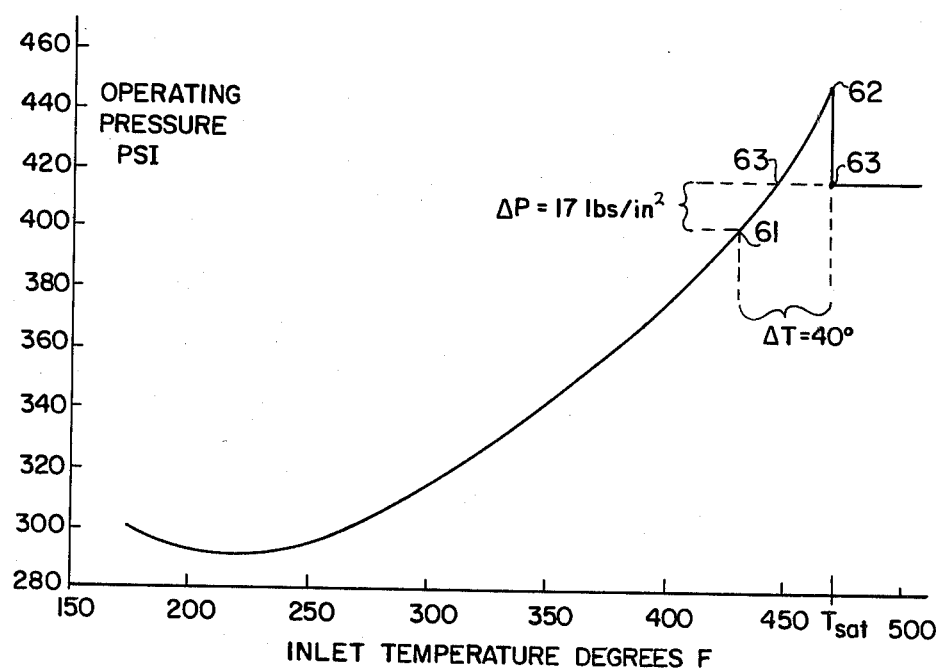
FIG. 4 shows a typical curve of the fluid pressure between the two orifices as a function of the temperature of the steam or condensate flowing into them.

The fluid pressure entering cylinder 22 through opening 29 to act on the piston 46 will be the same as the pressure in the passageways 21 and 23 between the two orifices 18 and 25. This pressure level will always be less than the pressure at the input 15 to the trap and greater than the pressure at the output 28. As a general rule, when the fluid pressure is maintained at a fixed level at the input 15, the pressure between the two orifices will be less when condensate is flowing through them than it will be when steam is flowing through them. FIG. 4 illustrates this relationship for a typical pair of orifices when the fluid pressure at the input is 500 PSI. At temperatures above the saturation temperature of about 470° F. for 500 PSI of pressure the fluid flowing through the orifices is entirely steam. Line 63-62 represents the co-existence of steam and condensate, and the resulting operating pressures possible at saturation temperature. Below the saturation temperature for a given pressure the fluid is entirely condensate. The pressure between the orifices varies from a low of 300 PSI at a temperature of 200° F. up to a high of 448 PSI at a temperature of 470° F. As the liquid changes to vapor at 470° F., the pressure drops down to 417 PSI. The size of the operating piston 46, the valve plug 43 and the spring 47 are designed so that the pressure produced by the dry steam will force the valve piston down and close the throttling element. The preferred embodiment of the invention shown in FIG. 1 was designed so that when the operating pressure drops 17 PSI below the pressure for steam, the valve piston will be moved to its open position to allow flow of condensate through the throttling element. Therefore, on the curve in FIG. 4, any pressure below point 61 on the curve will cause the piston to move to the open position and any pressure at or above the point 63 on the curve will cause the piston to move to the closed position. Whenever the temperature of the condensate flowing into the orifices moves from a low temperature towards the saturation temperature and becomes steam, the operating pressure must move over the peak 62 in the curve. In the curve of FIG. 4, the temperature of fluid flowing into the two orifices must decrease approximately 40° F. to cause the piston to move between its fully open and closed positions. It is desirable to keep this change in fluid temperature required to move the piston to as small a value as possible and therefore the distance between the two points 62 in the curve should be kept as small as possible. The size and position of the hump in the curve between the two points 63 is influenced by the size and shape of the two orifices. In general, the diameter of orifice 18 should be from 1.4 to 2.8 times the diameter of orifice 25. A curve similar to that shown in FIG. 4 was obtained when the orifice 18 was 2.8 times larger than the orifice 25. The orifice 25 should have a rounded entrance and the orifice 18 should be a thin plate orifice with sharp edges. Other combinations of orifice sizes and shapes may also be used.

As shown in FIG. 1, the steam trap as a whole comprises the trap body 12 which is mounted between the bottom plate 13 and the bonnet 11 using the nuts and bolts 14. The bonnet 11 may be removed to replace either of the two orifice discs 17 and 24 without disturbing the rest of the trap. It is necessary to also remove the adaptor plug 41 to replace either the spring 47 or the piston 46 and plug 43. Steam leaks from the various passageways are prevented by the gaskets 51, 52, 53, 54, 55, 56, and 57.

In operation, the forces acting to close the integral valve element formed by the valve plug 43, piston 46 and extension 45 include fluid pressure in cavity 22 and the spring force from spring 47. Opposing the valve closing forces are the inlet fluid pressure in passageway 35 and the discharge fluid pressure which acts on piston 46 in the cavity formed in the intermediate portion of the elongated chamber. The forces generated by the spring 47 and the discharge fluid pressure on piston 46 also help to overcome static friction forces occurring between a stationary valve plug 43 and a throttling element 48, as for example, when the differential pressure force between the bypass passageway and the main flow passageway is small. The static friction forces may have a high value because of the long stroke of the valve plug 43 and the tight clearances between the valve plug 43 and the throttling element 48.

The size of the operating piston 46, valve plug 43, and the spring 47, may be adjusted to provide whatever operating forces are required to move the valve plug through the throttling element 48. The stroke of the piston may be adjusted to be as large as necessary to completely open or close the throttling element. To prevent the piston 46 from bottoming against the top of piston 48, a stop element may be provided, for example, on valve plug 43 and/or bottom plate 13. In some embodiments of this valve, the amount of fluid leakage between the operating piston 46 and cylinder liner 42, and out through passageway 38 may be large enough to act as though this leakage was produced by a third orifice. In this situation, the sizing of the other two orifices should be adjusted to compensate for the fluid leakage past the operating piston in such a way that the proper operating pressures are still produced. In the preferred embodiment of the invention the spring 47 is arranged to force the valve plug 43 towards the closed position, so that upon failure of the spring 47 the valve plug 43 will assume an open position. The input 15 to the trap could also include a strainer of some type that would prevent small particles suspended in the fluid from passing into the trap and clogging up the orifices or the throttling element.

Obviously many other modifications and variations of this invention are possible in light of the above teachings. It is therefore to be understood, that within the scope of the appended claims the invention may be practiced otherwise than as specifically described.

What is claimed is:

1. A steam trap comprising:
a first orifice and a second orifice connected in series, the first orifice connected to the input of the trap and the second orifice connected to the output of the trap wherein the flow of fluid through the two orifices is continuous and, the size of the orifices proportioned to minimize the leakage of steam therethrough;
an annular fluid throttling element positioned between the input and the output of the trap, the throttling element having a plurality of resistive fluid flow passages;
inlet and outlet passageways respectively connecting the fluid throttling element to the input and the output of the trap;
a cylinder formed in the steam trap and located adjacent to the throttling element;
a control piston positioned in the cylinder, the cylinder is pressurized at one end portion by the fluid flowing between the first orifice and the second orifice wherein the fluid pressure between the orifices is applied to one end portion of the control piston, and the other end portion of the cylinder is connected to the trap output wherein the output fluid pressure is applied to the other end portion of the control piston; and
an elongated valve plug positioned within the throttling element for movement between an open and a closed position wherein one end portion of the valve plug is connected to the control piston, and the other end portion of the valve plug communicates with the inlet passageway for applying the inlet fluid pressure to said other end portion of the valve plug to urge the valve plug toward an open position wherein the fluid flow through the resistive fluid flow passages is increased.

2. The steam trap of claim 1 further comprising a spring means which is connected to the valve plug and the control piston for applying a force to assist in moving the valve plug.

3. The steam trap of claim 2 wherein:

the control piston and the valve plug are rigidly attached to each other; and
the connection between the spring means and the control piston is configured so that the force applied to the control piston by the spring means urges the valve plug toward the closed position within the throttling element wherein the fluid flow through the resistive fluid flow passages is reduced.

4. A steam trap comprising:
a first means connecting the trap to a high pressure steam line;
a second means connecting the trap to a discharge line;
a quiet valve of the type having multiple resistive flow passages interposed between and connected to said first and said second means, said valve having a valve plug operative in response to varying fluid pressures in said first and second means to adjust the flow through the valve;
a bypass means having first and second resistive orifices spaced apart;
a piston connected to said valve plug and fluidically communicating with the bypass means and said second means to operate in response to fluid pressure in said bypass means and said second means, said pressure in said bypass means varying in response to the proportionate mixture of steam and condensate flowing through said bypass means, and said orifices being adjusted to produce a pressure differential across said piston sufficient to operate said valve plug; and
a duct extending from said second means to said piston for applying the discharge pressure in the second means to said piston to oppose the pressure force on the piston from the fluid in said bypass means.

5. A steam trap as claimed in claim 4, which includes a spring biasing said valve to a closed position.

6. A steam trap as claimed in claim 4, in which said resistive flow passages are stacked in layers to be successively opened or closed by movement of said valve plug, said resistive passages reducing the velocity of the flow through said trap.

7. A steam trap constructed for quiet operation comprising:
a first means connecting the trap to a high pressure steam line;
a second means connecting the trap to a discharge line;
a quiet valve having multiple resistive flow passages interposed between said first and said second means, said valve having a valve plug operative to adjust the flow through the valve, said resistive flow passages are arranged in layers to be successively opened or closed by predetermined movement of said valve plug, and said resistive passages being operative to reduce the velocity of the flow through said trap;
an elongated chamber formed in said trap, said valve plug being movable within said chamber, said first and second means including main flow passages for fluid passing through said valve, and said main flow passages communicating with said resistive flow passages and one end portion of said elongated chamber;
a bypass means having fixed dimensions for said valve and being connected to the other end portion of said elongated chamber, said bypass means including a cavity communicating with said other end portion of said elongated chamber, a first conduit extending from said first means to said cavity and a second conduit extending from said cavity to said second means, and said bypass means further including restrictive orifices in said first and second conduits;

a piston connected to said valve plug and positioned to move within said elongated chamber in response to varying fluid pressure in said other end portion of said elongated chamber, said fluid pressure varying in response to the proportionate mixture of steam and condensate flowing through said bypass means, and said piston separating said other end portion of said elongated chamber from the intermediate portion of said elongated chamber; and a duct extending from said second means to said intermediate portion of said elongated chamber for maintaining said intermediate portion of said elongated chamber at the fluid pressure in said second means and for venting fluid in said intermediate portion of said elongated chamber upon movement of said piston.

8. A steam trap according to claim 7, further comprising a spring connected to said piston and disposed in said elongated chamber for biasing said valve to a closed position.

9. A steam trap comprises:

a conduit containing a first and second restrictive orifices connected in series and respectively connected to the input and the output of the trap;

a fluid throttling element having resistive flow passages positioned between the input and output of the trap;

inlet and outlet passageways respectively connecting the fluid throttling element to the input and the output of the trap;

an elongated chamber formed in the steam trap adjacent to the throttling element;

a control piston positioned in the chamber, the piston is pressurized at one end portion by fluid flowing between the first and second orifices and at the other end portion by the output fluid pressure; and an elongated valve plug positioned for movement within the throttling element, one end portion of the valve plug is connected to said other end portion of the piston, the other end portion of the valve plug communicates with the inlet passageway, and the inlet fluid pressure is applied to said other end portion of the valve plug to urge the valve plug toward an open position.

* * * * *